(No Model.)  6 Sheets—Sheet 1.

C. W. ROTH.
MACHINE FOR SPLITTING GRAIN.

No. 350,945. Patented Oct. 19, 1886.

WITNESSES
Edwin L. Bradford
Morton Toulmin

INVENTOR
Charles W. Roth
W. P. Leonard
Attorney (No Model.) 6 Sheets—Sheet 2.
C. W. ROTH.
MACHINE FOR SPLITTING GRAIN.

No. 350,945. Patented Oct. 19, 1886.

WITNESSES
Edwin L. Bradford
Morton Toulmin

INVENTOR
Charles W. Roth
W. P. Leonard
*Attorney*

(No Model.) 6 Sheets—Sheet 3.

C. W. ROTH.
MACHINE FOR SPLITTING GRAIN.

No. 350,945. Patented Oct. 19, 1886.

WITNESSES
Edwin L. Bradford
Morton Toulmin

INVENTOR
Charles W. Roth
W. P. Leonard
Attorney (No Model.) 6 Sheets—Sheet 5.

C. W. ROTH.
MACHINE FOR SPLITTING GRAIN.

No. 350,945. Patented Oct. 19, 1886.

WITNESSES
Edwin L. Bradford
Morton Toulmin

INVENTOR
Charles W. Roth
W. P. Leonard
Attorney

N. PETERS, Photo-Lithographer, Washington, D. C.

(No Model.)  6 Sheets—Sheet 6.
C. W. ROTH.
MACHINE FOR SPLITTING GRAIN.
No. 350,945. Patented Oct. 19, 1886.
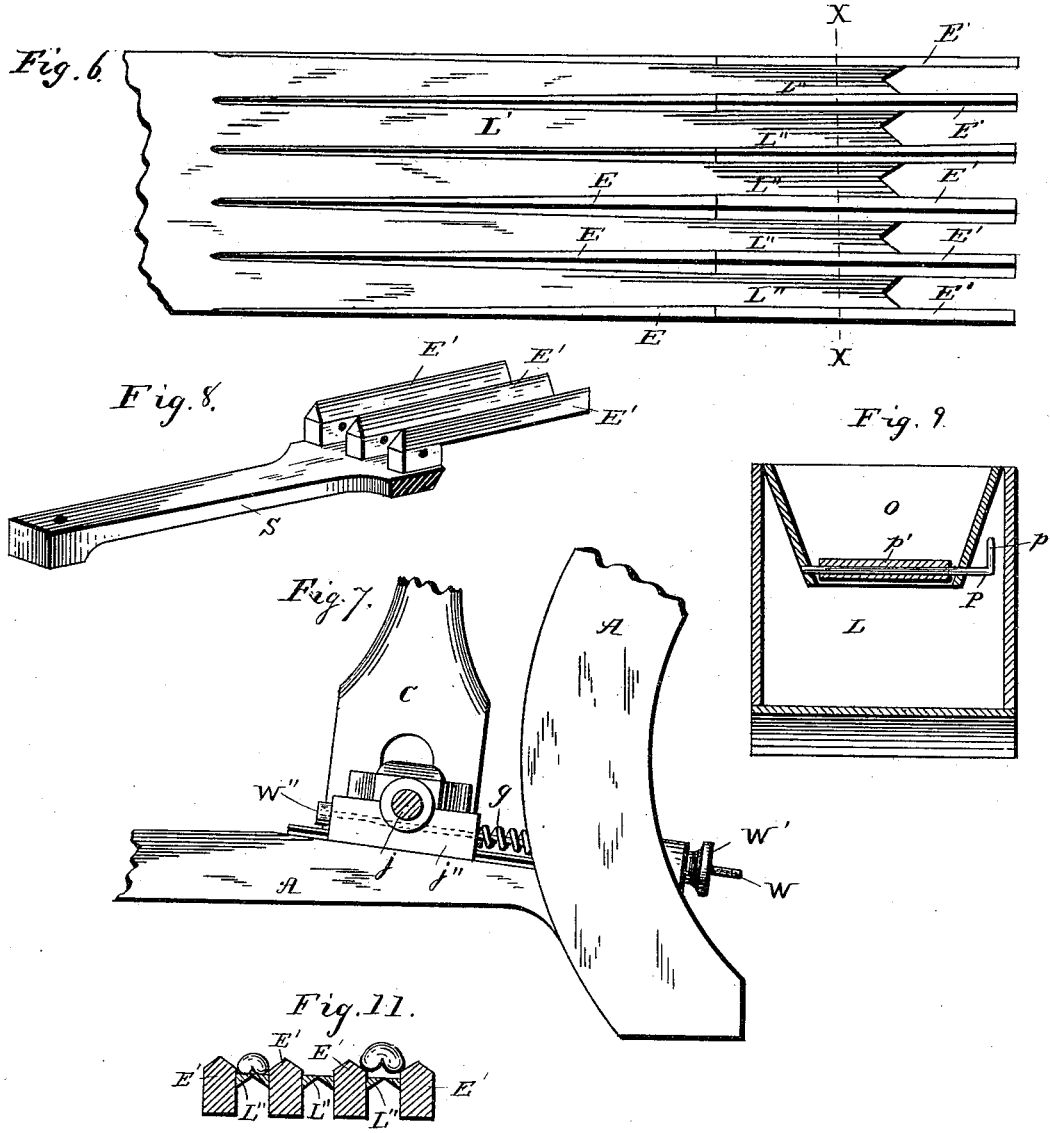

UNITED STATES PATENT OFFICE.

CHARLES WM. ROTH, OF EVANSVILLE, INDIANA.

MACHINE FOR SPLITTING GRAIN.

SPECIFICATION forming part of Letters Patent No. 350,945, dated October 19, 1886.

Application filed January 27, 1886. Serial No. 189,909. (No model.)

*To all whom it may concern:*

Be it known that I, CHARLES WILLIAM ROTH, a citizen of the United States, residing at Evansville, in the county of Vanderburg, State of Indiana, have invented certain new and useful Improvements in Machines for Splitting Grain, of which the following is a specification, reference being had therein to the accompanying drawings.

This invention relates to improvements in machines for splitting grain; and it has for its objects to provide means by which grain, especially wheat, may be cracked through the crease, thereby relieving the grain of crease dirt, and also of the germ. This object is attained by the mechanism illustrated in the accompanying drawings, forming a part of this specification, in which—

Figure 1:
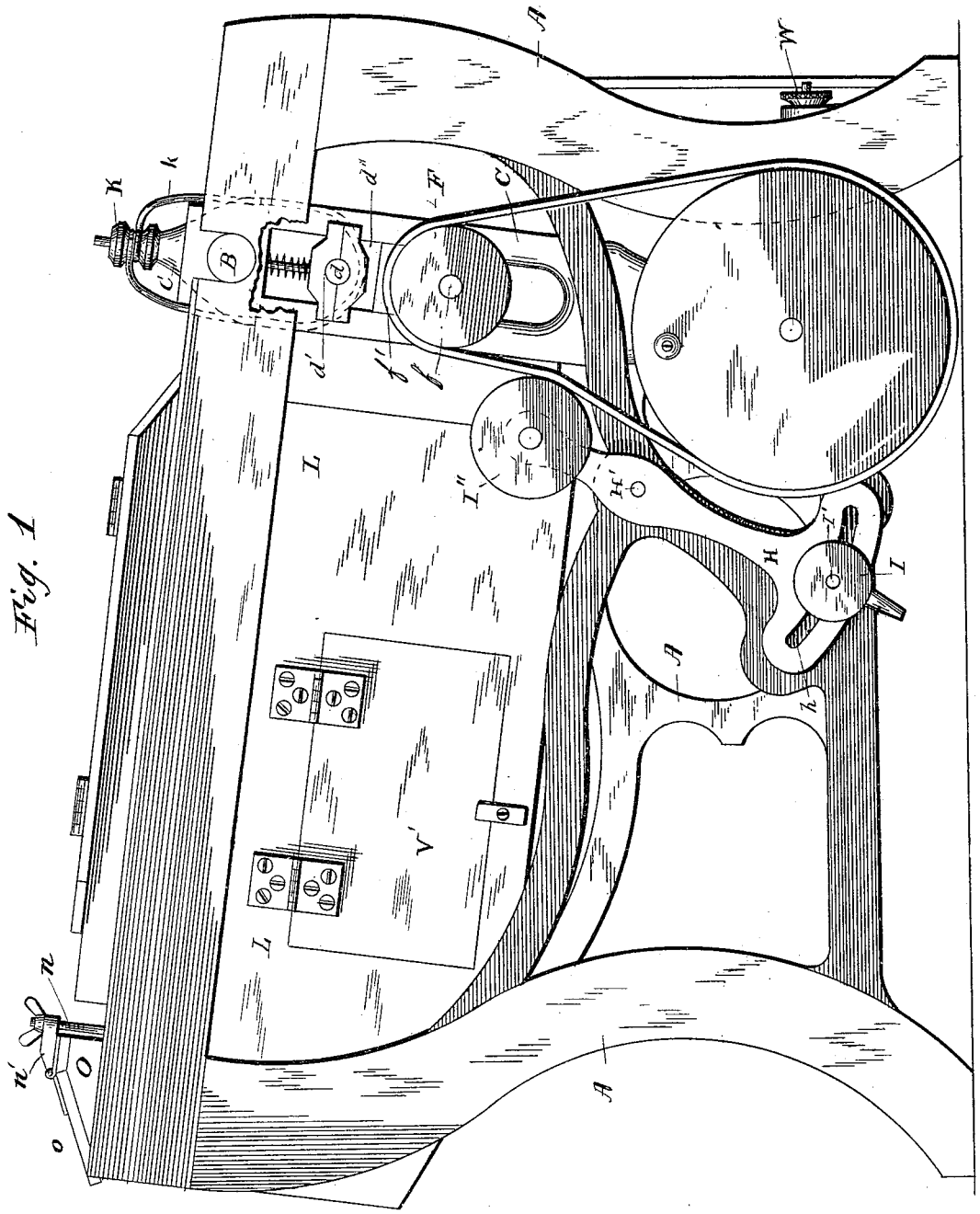
Figure 2:
Figure 3:
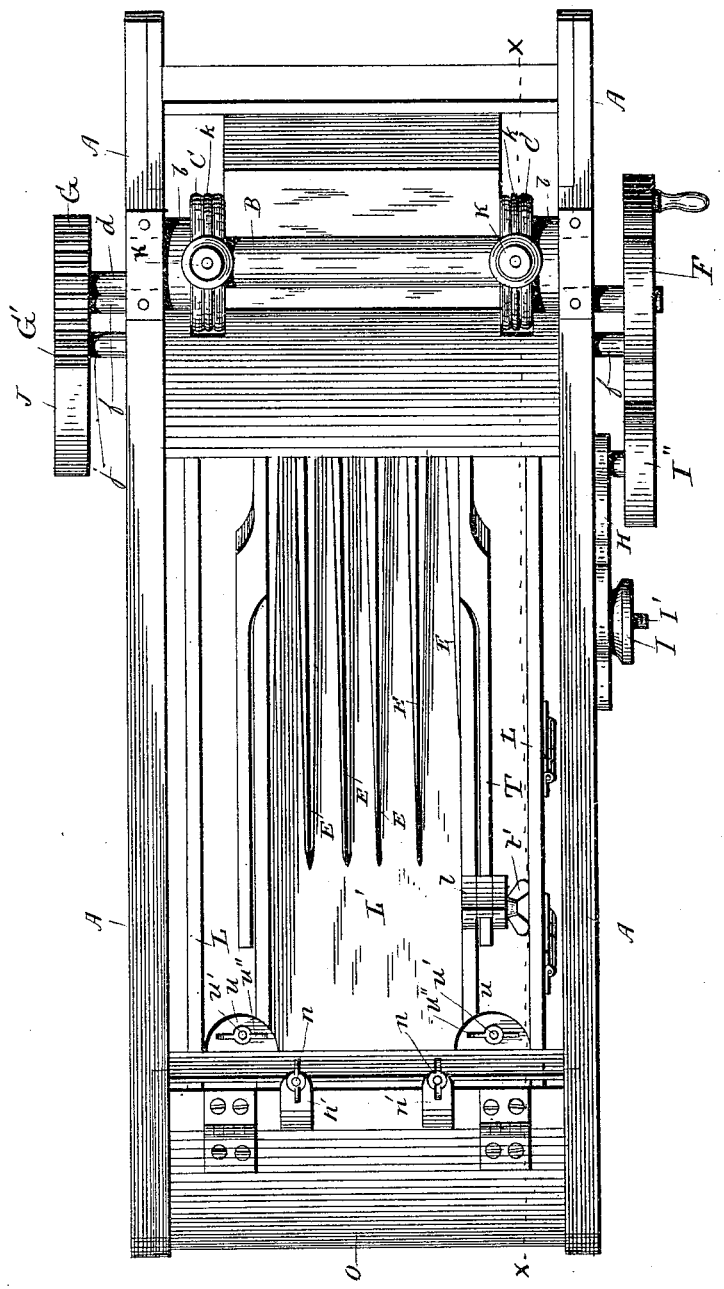
Figure 4:
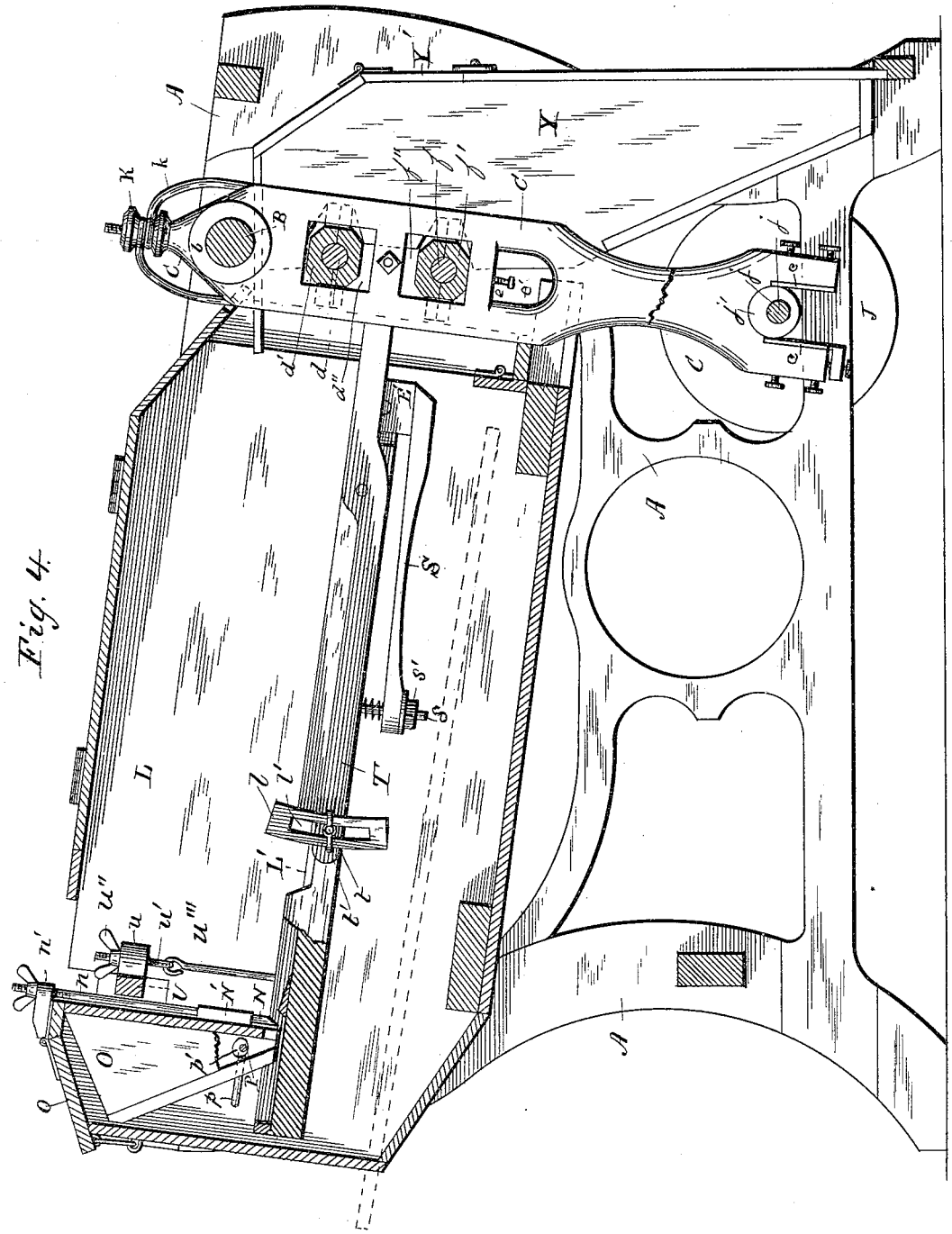
Figure 5:
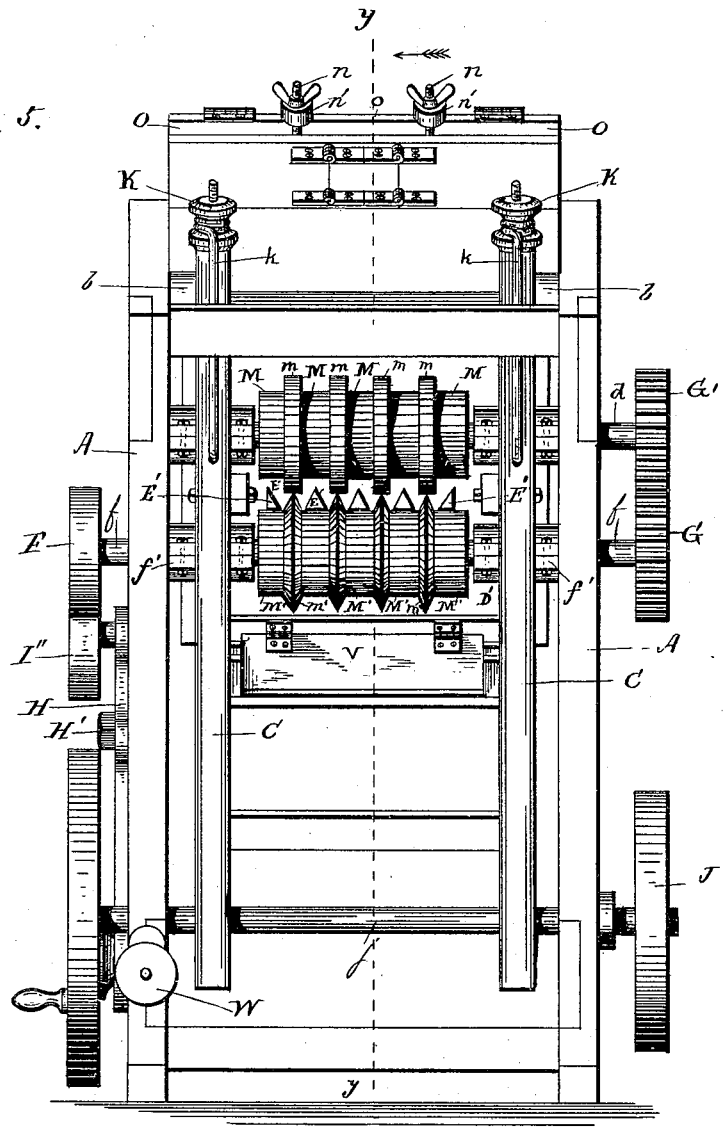
Figure 10:
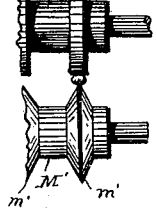

Figure 1 is an elevation taken from one side of the machine. Fig. 2 is an elevation from the opposite side. Fig. 3 is a plan with the door removed. Fig. 4 is a longitudinal section taken on the line $x\,x$ of Fig. 3. Fig. 5 is an end view with the chop-hopper box removed, and shows the internal construction at that end of the machine; Fig. 6, a plan view of a portion of the shaker-board; Fig. 7, a side view of a portion of the frame, showing the adjustable box and the lower end of one of the oscillating arms; Fig. 8, a detached perspective sectional view of several of the pivoted portions of the guide-strips and the attached lever; Fig. 9, a transverse sectional view of the box or casing and of the hopper, showing the cut-off and magnet; Fig. 10, a side elevation of a portion of the upper and lower rolls, showing a grain going through; and Fig. 11, a sectional view on line $x\,x$ of Fig. 6.

The letter A indicates the frame of the machine, which may be made of iron or other suitable material, and supports the working parts of the machine.

A shaft, B, extends across the top of the machine, and has bearings in the frame A. This shaft is provided with collars $b$, to maintain it in its proper position, and passes through suitable openings in the upper parts of two arms, C, which extend in a downward direction until they reach a point near the bottom of the frame A. These arms are intended to oscillate upon the shaft B, and have each a hand-wheel, K, by means of which the metal bands $k$, which pass under the bearings of the upper roll, may be raised or lowered, thus providing a means of adjustment when grinding, whereby the upper and lower rolls may be brought closer together or drawn farther apart.

D indicates the upper roll having a shaft, $d$, which has bearings in the adjustable boxes $d'$. These boxes are adapted to slide up and down in the slots $d''$ of the arms C, the said slots being of such size that the boxes $d'$ fit them at the sides, but of such length that the boxes may be moved up and down.

D' is the lower roll, and is provided with a shaft, $f$, having bearings in boxes $f'$, fitted to the slots $f'''$ in the oscillating arms C, the said slots $f''$ being likewise constructed with respect to the boxes $f'$, as the boxes $d'$ are with respect to the boxes $d''$. These boxes $f'$ rest upon adjusting-screws $e$ in the slots $e'$ of the oscillating arms C, by means of which the boxes $f'$ may be raised or lowered, and thereby raise or lower the roll D'. The oscillating arms C consist of bars of wood or metal having the slots already described, and of the shape, or substantially of the shape, shown more clearly in Fig. 4. The shaft $f$ is provided with a driving-pulley, F, at one end, and at the other with a spur-gear, G, which meshes into the spur-wheel G' on the shaft $d$, whereby motion is given to the rolls D D'. The lower ends of the oscillating arms C are bifurcated and provided with anti-friction adjustable wearing-plates $c$, and are adapted to engage with eccentrics $j'$, which are secured to the shaft $j$, having bearings in boxes $j''$, secured to the lower part of the frame A, and provided with a driving-pulley, J, whereby rotary motion is given to the shaft $j$, causing the arms C to oscillate. The boxes $j''$, one at each side of the machine, (one only being seen in the views,) are each adjustable by means of a screw-threaded rod, W, and a hand-wheel, W', a spiral spring, G, being interposed between the box and the adjacent portion of the frame to hold the box against the head W'' of the rod.

H is an arm pivoted to the frame A by a bolt, H', and has near the bottom a slot, $h$, through which passes a screw-bolt, I', attached to the frame A, and provided with a hand-wheel, I, by means of which the arm H may be fastened in different positions and cause the pulley I'' to bear upon the driving-belt and act as a belt-tightener.

L is a box, supported by the frame A, open at one end, and at the other end provided with a hopper, O, having a suitable door, o, to receive the wheat. Fitted across the hopper, near the lower end, is a shaft, P, one end of which terminates in a crank, p, by which it is adjusted, and secured to this shaft is a permanent magnet, p'—a bar of magnetized steel, for instance—a cross-section of which is elliptical, or substantially so. When the crank is adjusted as seen in Fig. 9, the grain will flow past the shaft and magnet upon the shaker-board. When, however, the crank is adjusted as seen in Fig. 4, the throat of the hopper is cut off by the longest transverse measurement of the magnet. The function of the magnet, then, is twofold, that of serving as a cut-off for the hopper and that of taking up any metallic substances. A feed-board, N, is attached to the hopper O by means of slides N', and is suspended by rods n, which pass through openings in lugs n', secured to the top of the hopper O. These rods are screw-threaded at their upper ends and have thumb-screws, whereby they may be raised and lowered for the purpose of adjusting the feed-board N to a higher or lower position. The vertical adjustment of the feed-board N controls the quantity of material which passes down the shaker-board L' from the hopper, while the cut-off board within the hopper serves to prevent or allow the grain to flow from out the hopper.

Across the top of the frame A is a bar, U, having lugs u, with openings through which are passed two rods, u', having their upper ends screw-threaded and provided with thumb-nuts u'', whereby the rods u' may be raised or lowered, together with a feed-board or shaker, L', which is suspended in the box L by means of the links u''', the upper ends of which are flexibly connected to the lower ends of the rods u' and their lower extremities to the shaker-board L'. A lug, l, having a slot, l', is attached to one side of the shaker-board L', and a screw-threaded bolt, t, having a thumb-nut, t', passes through the slot l' and is attached to one end of a rod, T. The nut t' enables the end of rod T to be secured in a higher or lower position in the lug l. At the other side of the shaker-board these devices are duplicated. The other end of each rod T extends to one of the arms C, and is pivoted thereto. The office of the rods T is to give a shaking motion to the shaker-board L'. This board has on its upper surface several longitudinal ribs or guides, E, which serve to direct the grain in the proper direction toward the rolls. Where the guides E terminate there are a corresponding number of pieces, E', pivoted in slots cut in the end of the shaker-board L', having their upper edges of a triangular cross-section, and these pieces extend to the rolls D D', and between them, in the annular grooves M therein. These pieces E' are adjusted up and down by means of a lever, S, which extends under the bottom of the shaker-board L', and is attached thereto at one end by the bolt s, which is surrounded by a spiral spring and passes through an opening in the end of lever S, having its lower end screw-threaded and provided with a thumb-nut, s', for purposes of adjustment. The lower ends of the pieces E' have lugs extending downwardly, by means of which they are attached to the lever S, the end of which is widened out for this purpose. The grain flows along down upon the upper surface of the shaker-board L'. When it reaches the smaller ends of the guides E, it travels in rows upon the shaker-board and between said guides. The adjustment of the lever S will raise or lower the pieces E' with respect to the portions L'' of the shaker-board. These pieces serve to guide the grains, and, as seen in Fig. 11, will allow the grains to rest upon L'' or not, according to the size of the grains. If the grains be small, then the lever is adjusted downward and the pieces E' upward above L''. When, however, the grains are large, then the lever is adjusted upward and the slats downward, so as to expose L'' to the grains and allow them to travel upon L''. These adjustments are made according to the character or size of the grain which is to be run through the machine. A transverse door, V, under the shaker-board L', is pivoted or hinged to the box L, and is intended to permit grain or dust to pass out from the end of the floor of the box L. A door, V', is hinged to one side of the box L, and is intended to permit access to be had to interior of the box L, whether for adjustment of any of the parts under the shaker-board L' or for purposes of cleaning, &c. A hopper, Y, provided with a door, Y', is attached to the machine in the rear of the rolls D D', and is intended to receive the split grain, which falls into it after passing between the rolls. The upper of these rollers is constructed with a series of annuli, m, spaced by a series of grooves, M, the annuli serving the purpose of resisting and supporting the grains as they are acted upon by the lower roller. This lower roller is constructed with a corresponding series of annuli, m', differing from the annuli m in that they are reduced to a substantially sharp edge, as seen in Fig. 5, and so disposed as to rotate about beneath the middle of the length of annuli m. The intervening spaces between the grooves M in the upper roller and the grooves M' are occupied by the pieces E'. The grain is acted upon by these rollers, as will presently appear. The box L is to be made of metal, for the reason that it must be susceptible to a heat greater than that, as a means of safety, wood or other inflammable material would stand, so that the grain, if damp, may be dried, and thus prevent the difficulty which must necessarily follow accumulations and permit an easy flow of the grain. If the grain is damp, more or less accumulation of grain will occur within the machine. To prevent this from happening, as above stated, the box L, which is the usual casing of the machine, is made of sheet metal, so that heat can be applied in any convenient manner to cause it to dry the grain as it passes through it, as by means of a pipe projected into the machine, as shown in dotted lines in Fig. 4.

An important part of this invention consists in regulating the flow of the grain from the hopper by the gate N to and upon the shaker-board L', the vibratory motion of which serves to evenly distribute the grain over the same, and the tendency of the grains individually being to turn with the crease downward. They pass in this position between the annuli $m'$ and $m$, and are split, as indicated in Fig. 10. The grain after having been thus treated is conducted to other machines for further treatment.

The object in adjusting the shaker-board L' to different inclinations is to cause the grain to travel more or less rapidly down it, to suit the speed at which the rollers are traveling.

The object of the springs 2 above the bearings of the upper roll is to keep the same under steady tension against the bands $k$, and to allow the passage between the upper roller and the lower roller, and particularly between the bands $m'$ and $m''$, of extraneous matter—such as nails, &c.—without incurring the risk of accidents in the way of breakage of shafts, &c. The faces of the annuli $m$ on the upper roll are made wider than the faces of the annuli of the lower roll, for the purpose of forming bases, against which the grain is forced by the annuli of the lower roller.

Having described my invention, what I desire to secure by Letters Patent, and claim, is—

1. The combination, in a machine for splitting wheat, with the frame having a cross-bar provided with lugs, the adjustable rod supported by the lugs, the links flexibly connected to the rods, the shaker-board connected to the links, the lever pivoted to the shaker-board, the pieces carried by the lever, and means to support the board at the end adjacent to the said pieces, of the rollers having, respectively, flat and sharp annuli, and mounted in proximity to said pieces.

2. The combination, with the rollers, of the shaker-board, adjustable devices for supporting the same, the rods pivoted to the sides of the shaker-board, and adjustably connected therewith at one of their ends, the oscillating arms, to which the other ends of the said rods are connected, the pieces pivoted to the shaker-board, and the lever connected with them, and adjustably connected at its free end to the said board.

3. In a machine for splitting wheat, the combination, with two rollers mounted in proximity, one constructed with flat annuli, and the other with sharp annuli, of a feeding-hopper, a shaker-board, and pieces extending from the said board between the annuli of the rollers.

4. The combination, in a machine for splitting wheat, with a frame and a box secured thereto, a shaker-board suspended within the said box, and provided with longitudinal directing-ribs, pieces forming a continuation of said ribs pivotally connected with said board, and the lever connected with the said pieces, and adjustably connected with the board, of a feeding-hopper located at one end of said board, and provided with means to regulate and adjust the quantity of the feed, and two rollers having, respectively, flat and sharp annuli, and mechanism to operate said rollers.

5. The shaker-board L', having guides E, pieces E', and lever S, adjustably attached to the bottom of said shaker-board L', in combination with rollers D and D', having annuli $m$, and annular grooves M between said annuli, as described, and for the purposes set forth.

6. In a machine for splitting wheat, the combination, with the rollers having annular grooves, the oscillating arms in which the rollers are mounted, and the shaft upon which the said oscillating arms are mounted, of the shaker-board suspended at one end, and having guide-ribs, and the pieces which enter the annular grooves of said rollers.

7. In a machine for splitting wheat, the combination, with the main frame, the oscillating arms, the shaft upon which they are mounted, the shaft having a pulley, and eccentrics engaging with the free ends of the oscillating arms, and the grain-rollers, each having shafts which fit bearings carried by said oscillating arms.

In testimony whereof I affix my signature in presence of two witnesses.

CHARLES WM. ROTH.

Witnesses:
W. P. LEONARD,
ROBERT DAY.